Jan. 13, 1948.  D. SIGMOND  2,434,371
DRESS BOTTOM CUTTER
Filed Jan. 23, 1942  4 Sheets-Sheet 1

INVENTOR
DAVID SIGMOND
BY
ATTORNEY

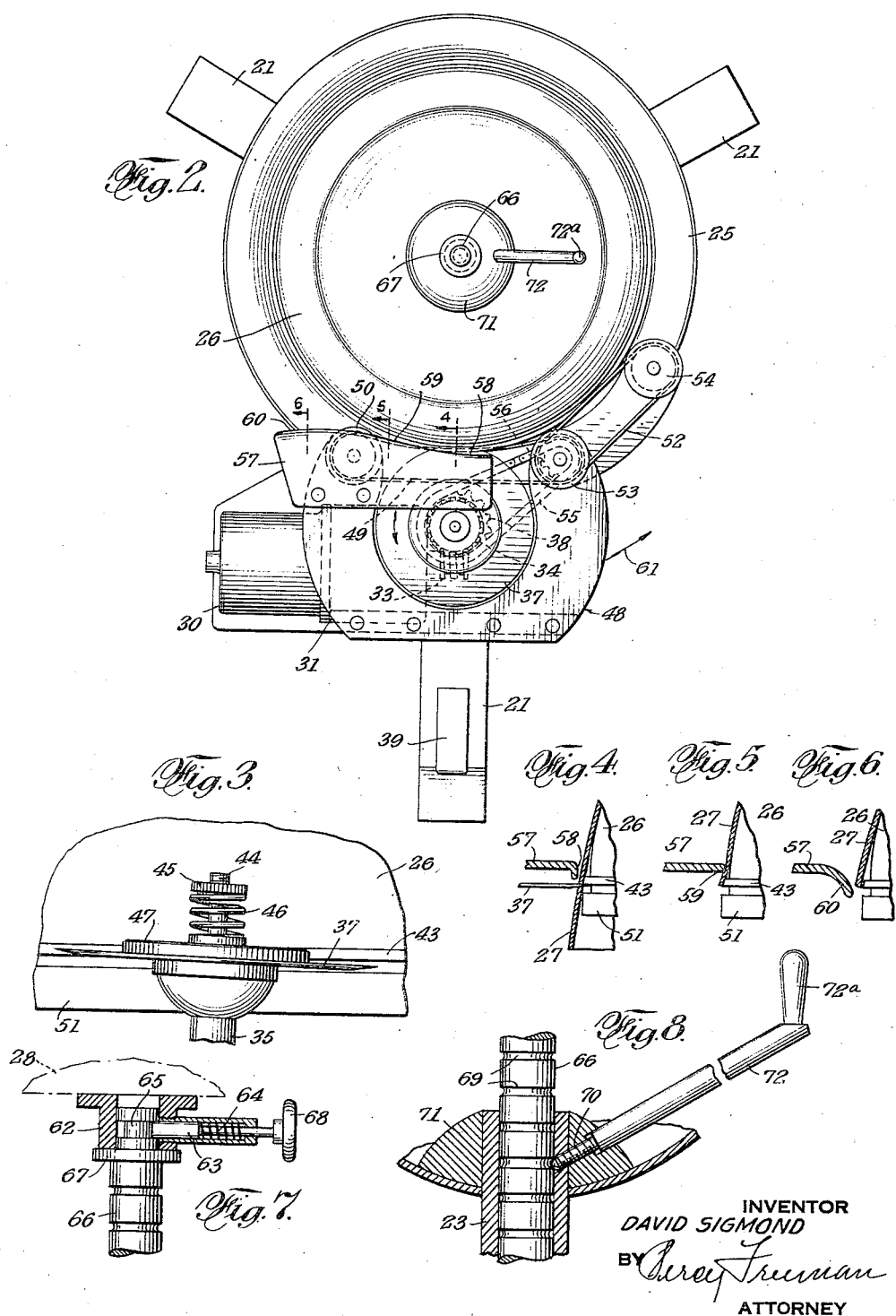

Jan. 13, 1948.  D. SIGMOND  2,434,371
DRESS BOTTOM CUTTER
Filed Jan. 23, 1942  4 Sheets-Sheet 3
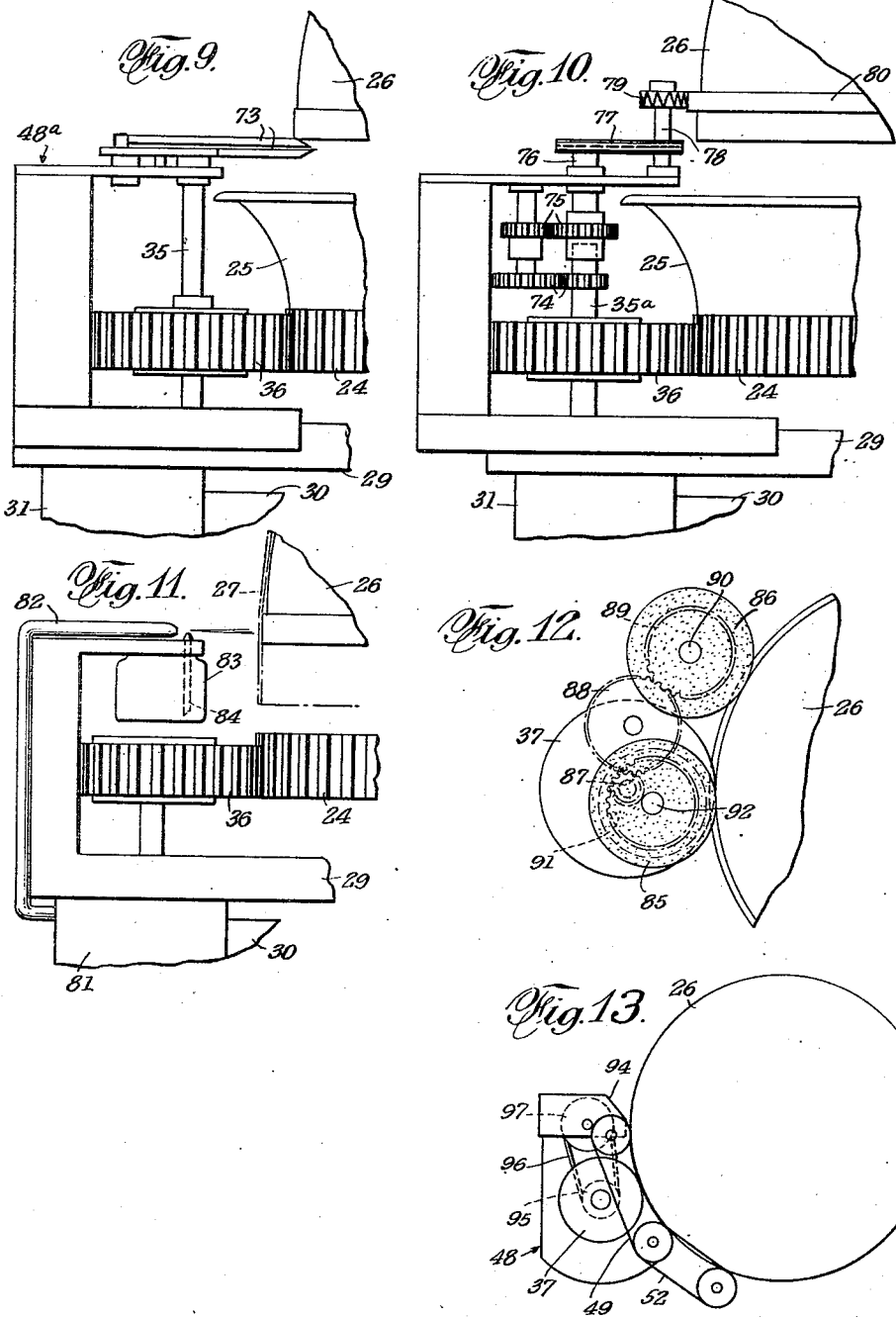
INVENTOR
DAVID SIGMOND
BY *Percy Freeman*
ATTORNEY Jan. 13, 1948.  D. SIGMOND  2,434,371
DRESS BOTTOM CUTTER
Filed Jan. 23, 1942  4 Sheets-Sheet 4

INVENTOR
DAVID SIGMOND
BY
ATTORNEY

Patented Jan. 13, 1948

2,434,371

UNITED STATES PATENT OFFICE 2,434,371

DRESS BOTTOM CUTTER

David Sigmond, Brooklyn, N. Y., assignor of one-half to D. B. C. Sales Corporation, New York, N. Y.

Application January 23, 1942, Serial No. 427,893

5 Claims. (Cl. 164—71)

This invention relates to bottom cutting machines for trimming the edges of shaped fabrics or for otherwise marking them whereby they may be trimmed along an even line.

A primary object of the invention is to provide a machine receptive of a garment form for supporting a dress or similar article in such a position as to have its unfinished bottom edge cut away by said machine upon an even and uniform line in an expeditious manner.

Another object of the invention is to provide a bottom cutting machine wherein the fabric being trimmed is held against inadvertent slipping movement to insure proper cutting thereof.

Another object of the invention is to provide means for properly holding garments having folds, pleats, or tucks to insure uniform cutting of the edge thereof.

Another object of the invention resides in the provision of means for regulating the position of the shaped fabric with respect to the cutting means of said machine whereby all sizes of articles, usually garments, may be effectively handled by said machine.

The invention is also concerned with the novel details of construction incorporated in the instant machine and in the simplicity of its structure.

The foregoing objects and others which will later become apparent, are realized in the embodiments of the invention which are illustrated in the accompanying drawings, said drawings forming the basis for the following detailed specification.

In the drawings:

Fig. 2 is a top plan view thereof.

Fig. 3 is a fragmentary detail view illustrating the relationship of one form of cutter to a cutting edge provided therefor.

Figs. 4, 5, and 6 are each detail sectional views showing different stages of a skirt fold gathering member employed in the machine.

Fig. 7 is a detailed sectional fragmentary view illustrating coupling means employed for mounting a dress form upon the machine.

Fig. 8 is a similar view showing releasable locking means for an adjustment member utilized in raising and lowering the dress form mounted on the machine.

Fig. 9 is a fragmentary side view showing the machine equipped with another form of cutting means.

Fig. 10 is a similar view showing the machine equipped with a pinking device.

Fig. 11 is a view similar to Fig. 9, showing the machine equipped with a marking instead of a cutting means.

Fig. 12 is a diagrammatic plan view showing an alternate form of feed employed in the machine.

Fig. 13 is a diagrammatic plan view illustrating the utilization of a sewing head employed for applying an overcast stitch to the cut edge of a dress after trimming thereof.

Figure 14:
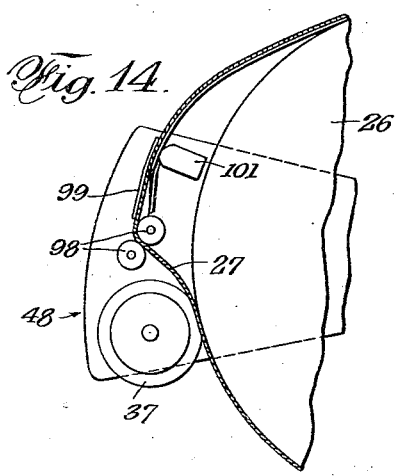

Fig. 14 is a diagrammatic fragmentary plan view illustrating means for hemming a garment after trimming thereof.

Figure 15:
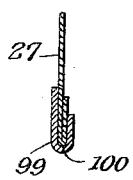

Fig. 15 is a fragmentary cross-sectional view showing edge folding means employed in the device of Fig. 14.

Figure 16:
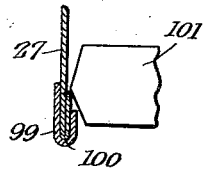

Fig. 16 is a similar view illustrating the stitching means thereof.

Figure 17:
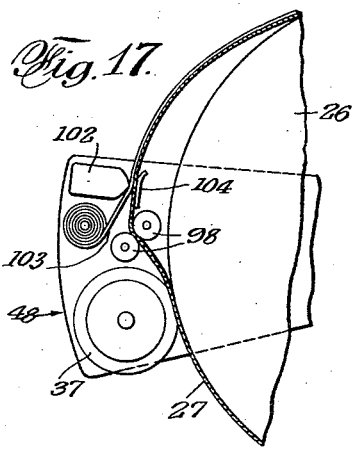

Fig. 17 is a view similar to Fig. 14 showing a device for stitching a tape to the trimmed edge of a garment.

Figure 18:
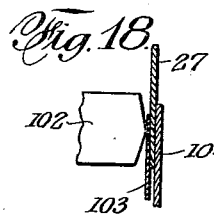

Fig. 18 is a detail sectional view at the stitching station thereof.

Figure 19:
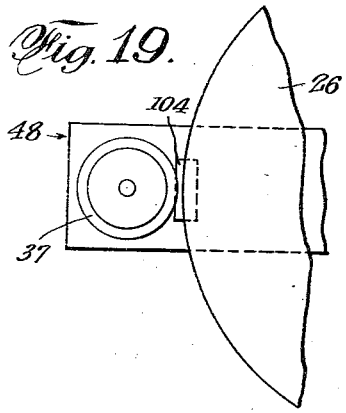

Fig. 19 is a diagrammatic fragmentary view showing the machine provided with two moving and cooperating knives, one of which is rotatable and the other fixed.

Figure 20:
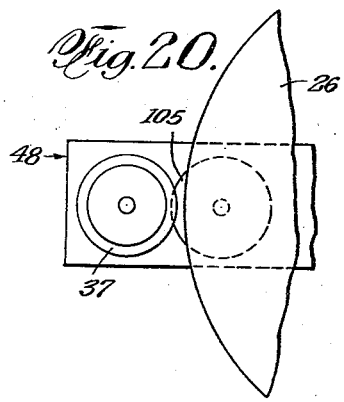

Fig. 20 is a similar view showing two rotatable knives.

In that form of the invention which is illustrated in Figs. 1–8, the bottom cutting machine herein contemplated includes a base 20 comprising the legs 21 and supporting a pedestal 22, said pedestal incorporating a fixed column 23. This column serves to rigidly mount a gear 24 carrying a trimming catcher 25, and a dome-like structure 26 serving as a filler core for the inner portion of a shaped fabric 27 mounted as on a dress form 28.

The pedestal 22 and the gear 24 are preferably spaced from each other to accommodate a bracket 29 which serves to mount the cutting, guiding and feeding means of the device.

Mounted on the bracket 29 in any suitable manner, is a motor 30 having a speed reducing unit 31, the latter being provided with a shaft 32 mounting a worm 33. The latter is arranged to mesh with and drive a worm wheel 34 upon a vertical spindle 35. The spindle 35 carries a gear pinion 36 in driving mesh with the gear 24, a disc knife 37, and a sprocket wheel 38.

One of the base legs 21 may incorporate an electric switch (not shown) controlled by a foot pedal 39 mounted on the designated leg 21. Electric current may be brought in any feasible manner to the mentioned switch and from said switch to the motor 30, commutator rings 40 carried by the pedestal 22 and brushes 41 carried by the bracket 29, being employed for this purpose in a well-known manner. To render the bracket 29 easy of rotation, thrust bearings such as shown at 42 may be used.

From the above it may be seen that upon operation of the motor 30 the gear pinion 36 will revolve and roll around the teeth of the fixed gear 24 causing bodily rotation of the bracket 29 and cutter 37 around the column 23.

As seen from Fig. 3, the disc knife 37 is set at an angle with respect to the dome 26 and particularly with respect to the knife platen 43 carried thereby so as to obtain a true shearing engagement therebetween whereby a dress or other fabric may be cleanly sheared upon rotation of the knife 37. The knife is preferably frictionally mounted, and for this purpose a stud 44 formed on the spindle 35 is provided with a thread for adjusting nut 45 to vary the compression of a spring 46 engaged between the nut 45 and a plate 47 clamping the knife 37.

The bracket 29 serves to mount a carriage 48 of which the knife forms a part, said carriage also carrying guide means for the skirt, means to hold it and means to compress it against the dome 26. The term "compress" includes a gathering action.

The holding means may comprise a belt 49 trained around pulleys 50 mounted on the carriage and having one run of said belt frictionally engaged with a fabric on an apron 51 on the dome 26. The driving relationship of the belt 49 with regard to the speed of movement of the carriage around the column 23 is preferably such as to provide a rolling engagement between the belt 49 and the fabric on the apron 51 so that the fabric engaged between the apron and the belt is held against relative movement during cutting by the knife 37.

The above holding means will serve amply for unpleated garments or those having a periphery according with the periphery of the apron 51. For pleated skirts, compressing means are provided in the form of a plurality of belts 52 mounted on pulleys 53 and 54 also carried by the carriage 48. These latter belts are tangentially arranged with respect to the dome 26 to serve as means for compressing and gathering in the folds or pleats of a garment to be engaged by the belt 49 and held thereby as before described.

The drives for both the compressing and holding means, in this machine, are initiated in the sprocket 38 which is provided with a chain 55 trained about a second sprocket 56, driving the pulleys 50 and 53 and thus the belts 49 and 52.

Additional guide means is provided in the form of a fixed plate 57, said plate being formed at a point adjacent the knife 37 with a sharp downreaching flange 58, said flange gradually being reduced until said plate is formed with an inwardly directed edge 59 and then again increasing to become a gradually curved flange 60. It may be seen that as the carriage travels in the direction of the arrow 61, the plate 57 as above described, serves to first confine flares or pleats in a skirt and then gradually releases them after the trimming by the knife has been accomplished.

The dress form 28 is mounted on the machine as shown in Fig. 7. To this end, the form is provided with a collar 62, provided with a detent 63, pressed as by a spring 64 to urge said detent into a circumferential groove 65 in a stem 66. The stem is formed with a flange 67 serving to locate and align the detent 63 with the groove 65. Handle means such as shown at 68 is provided to withdraw the detent 63 against the pressure of the spring 64 when dismounting of the form 28 from the stem is desired. Mounted in the above manner, the dress form is freely revolvable about the stem whereby a dress carried by the form may be suitably positioned with respect to the carriage 48, provided the bolt 63 is held in a withdrawn position. When bolt 63 is not withdrawn, form 28 is held fixed with respect to column 66 by the force of spring 64.

The dress form may be raised and lowered by hand to any suitable position to bring the bottom thereof in proper relation to the knife. To secure the form in adjusted position the stem 66 is provided with spaced grooves 69 selectively engageable by a stud 70 threadedly engaged in a member 71 carried by the dome 26. The threaded stud 70 may be formed with an elongated handle 72 having an offset portion 72a by means of which partial rotation of the stud 70 may be obtained for projecting it into engagement with one of the grooves 69 or retracting it therefrom. The stem 66 is of sufficient length to have a good bearing within the column 23 as shown particularly in Fig. 8.

The catcher 25 for the trimmed waste cut from a garment serves the function of gathering and holding said waste to obviate snarling of the machine mechanism thereby. While the foot operated lever 39 for the starting and stopping of the machine is desired, a hand operated control may be effectively employed.

Figure 1:
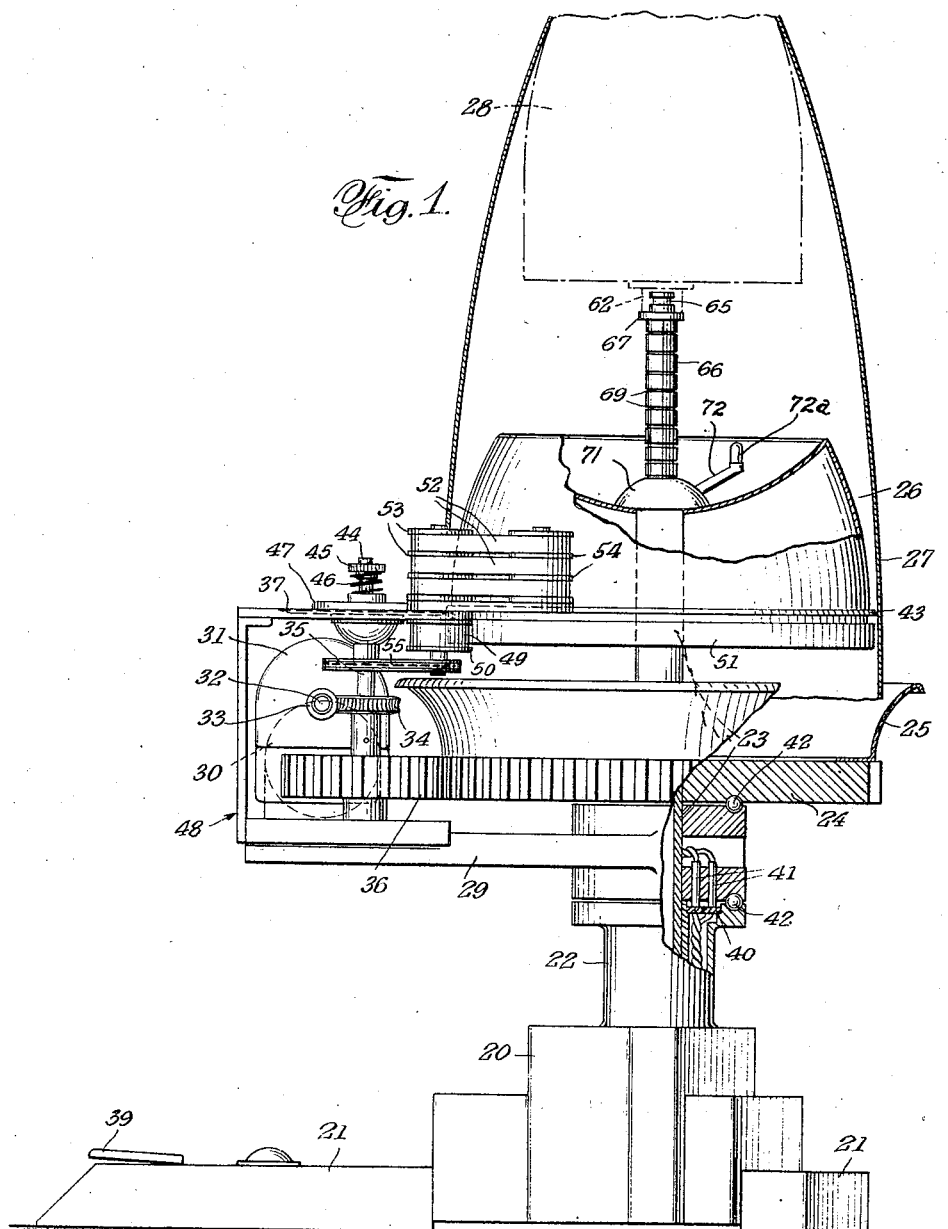
Fig. 1 is a side elevational view partly broken and partly in cross-section, of a machine incorporating features of the invention.

The machine above described functions in the following manner. A dress form is mounted upon the stem 66 which is positioned in accordance with the line along which a dress or other fabric mounted on said form is to be trimmed. Such a relationship is shown in Fig. 1. The foot-operated lever 39 is depressed to start operation of the motor 30. The carriage 48 will then revolve about the axis of the machine represented by the column 23. As the carriage rotates, the belts 52 serve to gather in the fabric, the fabric then being engaged by the band 49 and engaged by the knife 37, an inclined cut being made from the bottom edge of the fabric while manually pulling it down. It is not expected that one revolution of the carriage will at all times accomplish proper trimming inasmuch as a portion of the dress, when first applied to the machine, cannot be arranged for engagement by the knife. But normally, if the fabric has no pleats or folds, one revolution of the cutter plus a distance depending on the horizontal component of the inclined starting cut should be sufficient. However, if the skirt or fabric has pleats or folds through which the knife must cut, then upon a second revolution of the carriage around the axis of the machine that portion of the dress or other fabric which had remained uncut, will be cut to complete the trimming of said fabric. If any inequalities in the trimmed edge of the fabric remain after a second revolution of the carriage, a third or as many more of the revolutions as are required, may be made to insure trimming of the fabric along an even line.

The machine may be made to operate with a shears cutter instead of the rotary cutter previously described. Fig. 9 shows such a construction wherein the motor 30 having reducing gear 31 drives a spindle 35 to operate the shear blades 73 which are positioned with respect to the dome 26 to effect shearing of the skirt edge. The shears illustrated are available on the open market and need not here be described except to say that the blades 73 are vibrated at a high rate of speed and are not operated in the usual manner of hand shears. The travel of the carriage 48a serves to effect shearing of the vibrating blades as the carriage progresses in this movement.

It may be desired to form a skirt bottom with a pinked edge. For this purpose, as shown in Fig. 10, the motive means may be employed to drive a shaft 35a, which through gears 74 and 75 drives a shaft 76. The shaft 76 may be arranged to drive, as through a chain 77, a spindle 78 mounting a pinking roller 79 having engagement with a platen 80 on the dome 26. The gearing ratio is such as to cause the pinking cutter 79 to roll around the platen 80 in accordance with the driving speed between the gear 24 and the gear pinion 36. In other respects, the machine may follow that described for Fig. 1.

Instead of trimming the edge of the skirt, the edge may be marked by chalk or the like, to be trimmed by hand. Such a device is shown in Fig. 11 wherein the motor 30 operates a compressor 81 which may be driven directly by the motor or by reduction gear thereon. The compressor is formed with a tube 82 arranged to atomize powder chalk or the like from a container 83. This may be accomplished in a well-known manner, the blast of the air from the tube 82 drawing the powder upwardly in a tube 84 to direct the same against a skirt 27 mounted on the dome 26.

The form of the invention described in Fig. 11 may be combined with any of the forms in which cutting is accomplished, so that a skirt may both be trimmed and provided with a mark above the trimmed line to indicate the hem fold of said skirt when the hem is to be later formed.

The holding of the skirt may be accomplished in other ways than that by the band 49 as before described. For instance, as shown in Fig. 12, a pair of felt wheels 85 and 86 may be arranged to engage the fabric on the dome 26 and to roll therearound as the carriage moves about the axis of the machine. These wheels may be driven in any suitable way. As shown, the axle of the knife 37 is provided with a pinion 87, said pinion through an intermediate gear 88 driving a gear 89 on the shaft 90 of the felt wheel 86. The felt wheel 85 may be driven from the pinion 87 as by means of an internal gear 91 carried by the shaft 92 of the latter wheel.

It is sometimes desired to finish off the skirt edge after trimming as by applying an overcast stitch thereto. The machine herein contemplated may readily be provided with a sewing machine head 94, as shown in Fig. 13, to accomplish this sewing operation subsequent to the trimming of the skirt by the knife 37. The sewing machine head may be driven in any suitable manner. In the present instance, the pulley 95 is provided on the axis shaft of the knife and a belt 96 trained about said pulley is engaged with a pulley 97 on the machine head to drive the same and to accomplish the above-indicated sewing operation.

A desired manner of finishing off the garment edge is shown diagrammatically in Fig. 14 in which all drives are omitted, it being obvious how they may be applied. In this form of the machine, after the garment is trimmed by the knife 37, the garment 27 is guided away from the bowl 26 by means such as the rolls 98 and then through a device 99 for forming a fold in the trimmed garment edge as at 100. A stitching head 101, preferably to form a blind stitch, is mounted on the carriage 48 to stitch the fold in place as best seen in Fig. 16. In the above manner, the bottom edge of a garment may be completely processed while mounted upon the herein contemplated machine.

Still another way of treating the garment is shown by the diagrammatic means of Fig. 17 wherein, after trimming by the knife 37, the garment is guided by rolls 98 to a sewing device 102 which sews a tape 103 to the trimmed edge as seen in Fig. 18. A backing member 104 may be used to back-up the garment at the sewing station.

Instead of the revolving knife acting against a fixed platen as shown in Fig. 3, a fixed knife or platen 104 may be mounted upon the carriage 48 to move therewith and coact with the knife 37 for trimming the garment. Such an arrangement is diagrammatically disclosed in Fig. 19. Fig. 20 shows yet another arrangement wherein a freely revolving knife 105 coacts with the driven revolving knife 37. The carriage 48 in Figs. 19 and 20 rotates orbitally about the dress form.

From the foregoing it may be seen that a machine in various forms has been disclosed for accomplishing the purposes of the invention. No limitation in the foregoing description as regards the following claims, is intended inasmuch as it is feasible to construct other forms of the invention than those disclosed.

Having thus described my invention, what I claim as new and desire to secure by Letters Patent, is:

1. A machine of the character described comprising a base, a gear fixed to said base, a carriage mounted on said base, a pinion gear on said carriage and engaged with the mentioned gear, a motor carried by the carriage for driving the pinion gear to cause the carriage to revolve around the fixed gear and thereby moving said carriage around the vertical axis of the base, a fixed knife platen carried by the base, and a rotary cutter on the carriage and engaged with said platen to shear a shaped fabric which is on said base and has its bottom edge portion surrounding said knife platen.

2. A machine of the character described comprising a base, a gear fixed to said base, a carriage mounted on said base, a pinion gear on said carriage and engaged with the mentioned gear, a motor carried by the carriage for driving the pinion gear to cause the carriage to revolve around the fixed gear and thereby moving said carriage around the vertical axis of the base, a fixed knife platen carried by the base, means for adjustably mounting a support form on said base whereby the bottom edge portion of a shaped fabric thereon surrounds said knife platen, and a rotary cutter on the carriage and engaged with said platen to shear said shaped fabric during movement of the carriage.

3. A machine of the character described comprising a base, a gear fixed to said base, a carriage mounted on said base, a pinion gear on said carriage and engaged with the mentioned gear, means carried by the carriage for driving the pinion gear to cause the carriage to revolve around the fixed gear and thereby moving said carriage around the vertical axis of the base, a fixed knife platen carried by the base, means for adjustably mounting a support form on said base whereby the bottom edge portion of a shaped fabric thereon surrounds said knife platen, and a rotary cutter on the carriage engaged with said platen to shear said shaped fabric during movement of the carriage, and means on the carriage for gathering, guiding and holding said shaped fabric during the shearing operation.

4. In a machine of the character described, a base, a garment spreading dome on said base, a trimming waste catcher beneath said dome, and a revoluble trimming carriage coacting with said dome for trimming the edge of a garment, the line of coaction between said dome and carriage being above said trimming waste catcher whereby said waste is prevented from falling into and becoming snarled with the carriage mechanism.

5. In a machine of the character described, a revoluble garment trimming carriage, and shearing means on said carriage comprising a pair of cooperating rotatable knives.

DAVID SIGMOND.

REFERENCES CITED

The following references are of record in the file of this patent:

UNITED STATES PATENTS

| Number | Name | Date |
|---|---|---|
| 2,196,145 | Stanziale | Apr. 2, 1940 |
| 1,712,047 | Moffatt | May 7, 1929 |
| 2,192,446 | Lehde | Mar. 5, 1940 |
| 1,107,062 | Hamburger | Aug. 11, 1914 |
| 2,332,358 | Valentine | Oct. 19, 1943 |